US008520689B2

(12) United States Patent
Ophir et al.

(10) Patent No.: US 8,520,689 B2
(45) Date of Patent: Aug. 27, 2013

(54) NETWORK INTEROPERABILITY BETWEEN IP COMMUNICATIONS NETWORKS OR SUB-NETWORKS

(75) Inventors: Shai Ophir, Moshav Ein-Vered (IL); Edy Rozenfeld, Yahud (IL); Rafael Rubin, RaAnana (IL); Li-On Raviv, Petach Tikva (IL)

(73) Assignee: StarHome GmbH, Zurich (CH)

( * ) Notice: Subject to any disclaimer, the term of this patent is extended or adjusted under 35 U.S.C. 154(b) by 760 days.

(21) Appl. No.: 12/685,689

(22) Filed: Jan. 12, 2010

(65) Prior Publication Data

US 2010/0177780 A1 Jul. 15, 2010

Related U.S. Application Data

(60) Provisional application No. 61/144,464, filed on Jan. 14, 2009.

(51) Int. Cl.
*H04L 12/28* (2006.01)

(52) U.S. Cl.
USPC .......................................... 370/401; 709/250

(58) Field of Classification Search
USPC ................... 370/401, 331; 709/230, 250
See application file for complete search history.

(56) References Cited

U.S. PATENT DOCUMENTS

| 6,802,068 B1* | 10/2004 | Guruprasad | 719/319 |
|---|---|---|---|
| 2002/0184393 A1* | 12/2002 | Leddy et al. | 709/250 |
| 2007/0086581 A1* | 4/2007 | Zhu et al. | 379/88.17 |
| 2007/0115993 A1* | 5/2007 | Cohen | 370/392 |
| 2009/0073936 A1* | 3/2009 | Jentz et al. | 370/331 |

FOREIGN PATENT DOCUMENTS

WO  WO 99/55107  10/1999

OTHER PUBLICATIONS

Communication Pursuant to Rules 70(2) and 70a(2) EPC and Reference to Rule 39(1) EPC Dated Jul. 26, 2010 From the European Patent Office Re. Application No. 10150560.0.
Response Dated Jan. 9, 2011 to Communication Pursuant to Rules 70(2) and 70a(2) EPC and Reference to Rule 39(1) EPC of Jul. 26, 2010 From the European Patent Office Re. Application No. 10150560.0.
European Search Report and the European Search Opinion Dated Apr. 29, 2010 From the European Patent Office Re.: Application No. 10150560.0.
Galán et al. "Design and Implementation of An IP Multimedia Subsystem (IMS) Emulator Using Vitualization Techniques", Proceedings of the 13th HP Oveview University Association Workshop (HP-OVUA), XP002580186, May 21, 2006. Retrieved From the Internet. Sections 1, 4, Figs.5, 6.
Marjou et al. "Best Current Practice for a Session Initiation Protocol (SIP) Transparent Back-to-Back User-Agent (B2BUA). Draft-Marjou-Sipping-B2BUA-01", IEFT Standard-Working-Draft, Internet Engineering Task Force, IETF, XP015051976, 1: 1-31, Jul. 9, 2007.
Oredope et al. "Plugging 3G Mobile Networks Into the Internet: A Prototype-Based Evaluation", IEEE Proceedings of the 15th International Conference on Computing (CIC'06), XP031024815, p. 406-411, Nov. 1, 2006. Section 2.3.
Salazar Gaitán et al. "Enabling Roaming in Heterogeneous Multi-Operator Wireless Networks", Journal of Communications, XP002473400, 2(4): 18-28, Jun. 30, 2007. Sections 111.4, V, VI, Fig.2.

* cited by examiner

*Primary Examiner* — Wei Zhao

(57) ABSTRACT

Gateway apparatus for interworking between source and destination communication networks, to solve issues of absence of mutual recognition between the source and destination networks when communication within the networks uses internet protocol (IP). The apparatus comprises a source network front end emulator for emulating front end IP server components of the source network to the destination network; and a destination network front end emulator for emulating front end IP server components of the destination network to the source network. The apparatus, by virtue of the emulators, mediates communications between the source and destination networks.

11 Claims, 12 Drawing Sheets

NETWORK INTEROPERABILITY BETWEEN IP COMMUNICATIONS NETWORKS OR SUB-NETWORKS

RELATED APPLICATION/S

This application claims the benefit of priority of U.S. Provisional Patent Application No. 61/144,464 filed on Jan. 14, 2009, the contents of which are incorporated by reference as if fully set forth herein.

FIELD AND BACKGROUND OF THE INVENTION

The present invention relates to a device and method for network interoperability between fully IP communications networks or sub-networks or networks that use IP for communication either fully or partially, and, more particularly, but not exclusively to providing communications networks around the world with interconnectivity even when there are no business relations between the respective networks.

The concept of a roaming broker has been proven in the GSM world by the existence of several GSM roaming brokers. Some of them have been initiated by the GSMA, the GSM association. The need for a roaming broker is caused mainly by the fact that new & small operators do not have the time and resources to sign roaming agreements with many existing operators in order to serve the needs of their outbound roamers, or that the large operators do not have resources to sign roaming agreements with the new small operators. International Patent Application No. WO9955107 to Swisscom addresses such roaming brokers, and in particular issues such as how mobile identities from a non-recognized network can obtain roaming registrations by switching the roamer's home network identity to a broker's identity which is recognized by the roaming network.

In the next generation of communications, the issue is expected to be much more extensive and no longer restricted to roaming or to mobile telephones. Next generation communications networks are expected to be based on Internet protocol (IP). Not only will there be more mobile networks but such interworking issues may apply to fixed line and cable networks which wish to place calls with any other network in the world. Furthermore there will be large numbers of smaller networks, say from the WiFi/WiMAX arena. Operators of WiFi/WiMAX network, ranging from citywide to hotspot type networks will also want to provide their users with full connectivity, and it will be impossible for every small hotspot operator to be included in full interworking agreements. Thus there will be IMS (IP Multimedia Sub-system) players and also fixed-line and cables network operators requiring interworking, but their sheer numbers will make full interworking impractical.

Long term evolution (LTE) refers to standards for a fourth generation of mobile telephony 4G. LTE calls for a theoretical capacity of up to 100 Mbit/s in the downlink and 50 Mbit/s in the uplink. Most major mobile carriers in the United States and several worldwide carriers have announced plans to convert their networks to LTE, and the world's first publicly available LTE-service was opened in the two Scandinavian capitals Stockholm and Oslo on the 14 Dec. 2009, and branded 4G. The physical radio interface was at an early stage named High Speed OFDM Packet Access (HSOPA), now named Evolved UMTS Terrestrial Radio Access (E-UTRA).

Next Generation Networks (NGN), may include LTE as the infrastructure that replaces the current GPRS layer. IMS, discussed in greater detail below, may be layered on top of an LTE layer, but not necessarily. One may have LTE alone, without IMS. An alternative is to have IMS alone, on top of GPRS, without LTE. In LTE, the relevant network components are the MME which is discussed below and which functions like the VLR in the legacy GSM network. Another component is the home subscriber server or HSS, which has shared functionality with the HLR of the GSM network. In LTE Roaming, the MME sends a registration request for a new inbound roaming user to the home HSS. The protocol used is Diameter, by contrast with the legacy GPRS network, where MAP is used, and in addition to the IMS registration where SIP is used.

The IP Multimedia Subsystem (IMS) is an architectural framework for delivering Internet Protocol (IP) multimedia services. It was originally designed by standard bodies such as the 3GPP, the 3rd Generation Partnership Project, as a part of the vision for evolving mobile networks beyond GSM. Its original formulation (3GPP R5) represented an approach to delivering "Internet services" over the general packet radio service (GPRS). This vision was later updated by 3GPP, 3GPP2 and TISPAN by requiring support of networks other than GPRS, such as Wireless LAN, CDMA2000 and fixed line.

To ease the integration with the Internet, IMS uses Internet Engineering task force (IETF) protocols wherever possible, e.g. Session Initiation Protocol (SIP). IMS intends to aid the access of multimedia and voice applications from wireless and wireline terminals, i.e. create a form of Fixed Mobile Convergence (FMC). This is done by having a horizontal control layer that isolates the access network from the service layer.

At the moment, the interworking issue arises mainly with cellular networks and with roaming, since the roaming telephone has to register with its home network before the call is allowed. The issue is not critical where PSTN is involved since fixed line phones do not roam but also because international telephone connections often manage to lose their source information, the CLI, over the international connections, so that the receiving network does not know where the call originates from. Thus today, International calls can often be placed between two countries that are in a state of war, since the receiving network does not know the call's origin. However the IP protocol preserves the source information and thus the problem will start to be an important one for fixed line networks.

Another issue is the appearance of the virtual operator. There already exist telephone operators who do not own any switches or wires. They simply buy telephone time wholesale at a discount from a wireline operator and sell the time on to their customers. The emergence of mobile virtual network operators (MVNOs), who do not have base stations or spectrum of their own but buy time wholesale is also expected. In fact the wireline operators themselves may establish MVNOs and increase the number of mobile operators and hence the roaming capabilities. The need for each pair of mobile operators to sign a roaming agreement imposes a difficult enough restriction, but when this is extended to interworking between networks overall, and when the expected mass IMS deployment takes place, it is clear that one-to-one agreements will not be feasible.

That is to say, interworking is not needed only for the case of roaming, where a roaming subscriber is involved, but also in the case of international interoperability between IMS networks which do not have direct relations. In IMS, in order for a session to go directly from network A to network B, both networks may be expected to have bi-lateral agreements.

One possible option would be to use an international carrier. But such an international carrier would have to emulate an IMS network as well. Therefore the same interoperability issues may apply to the International carrier.

SUMMARY OF THE INVENTION

According to one aspect of the present invention there is provided a gateway apparatus for interworking between source and destination communication networks, wherein there is an absence of mutual recognition between the source and destination networks, communication within the networks using internet protocol (IP), the apparatus comprising:

a source network front end emulator for emulating front end IP server components of the source network to the destination network; and a destination network front end emulator for emulating front end IP server components of the destination network to the source network; thereby to mediate communications between the source and the destination networks.

The apparatus may be located in association with a third communication network entity that is recognized by both the source network and the destination network.

In an embodiment, the communications use the session initiation protocol (SIP) and wherein the front end IP server component emulations comprise SIP functions.

In an embodiment, the communication is a roaming registration communication between a mobile device registering at the source network and seeking registration confirmation from the destination network.

In an embodiment, the destination network front end emulator emulates an interrogating-call session control function server (I-CSCF) to the proxy-call session control function server (P-CSCF) of the source network, and the source network front end emulator emulates a P-CSCF to the I-CSCF of the destination network.

In an embodiment, the destination network front end emulator emulates an interrogating-call session control function server (I-CSCF) to the serving-call session control function server (S-CSCF) of the source network, and the source network front end emulator emulates an S-CSCF towards the interrogating-call session control function server (I-CSCF) of the destination network.

In an embodiment, the communications use the diameter protocol, and wherein the front end IP server component emulations comprise diameter functions, and the communication is a roaming registration communication between a mobile device registering at the source network and seeking registration confirmation from the destination network.

In an embodiment, the source network front end emulator emulates an MME to the HSS of the destination network, and the destination network front end emulator emulates an HSS to the MME of the source network.

In an embodiment, the source network front end emulator emulates an S gateway to the PDN gateway of the destination network, and the destination network front end emulator emulates PDN gateway to the S gateway of the source network.

In an embodiment, the source network front end emulator emulates a V-PCRF to the H-PCRF of the destination network and the destination network front end emulator emulates an H-PCRF to the V-PCRF of the source network.

In an embodiment, the source network front end emulator comprises a source address substitution unit to substitute, within data packets, an address indicating the source network with an address indicating the third communication network entity.

In an embodiment, the destination network front end emulator comprises a destination address substitution unit to substitute, within data packets, an address indicating the destination network with an address indication the third communication network entity.

According to a second aspect of the present invention there is provided a method for interworking between source and destination communication networks, wherein there is an absence of mutual recognition between the source and destination networks, communication within the networks using internet protocol (IP), the method comprising:

emulating front end IP server components of the source network to the destination network; and emulating front end IP server components of the destination network to the source network; thereby to mediate communications between the source and the destination networks.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
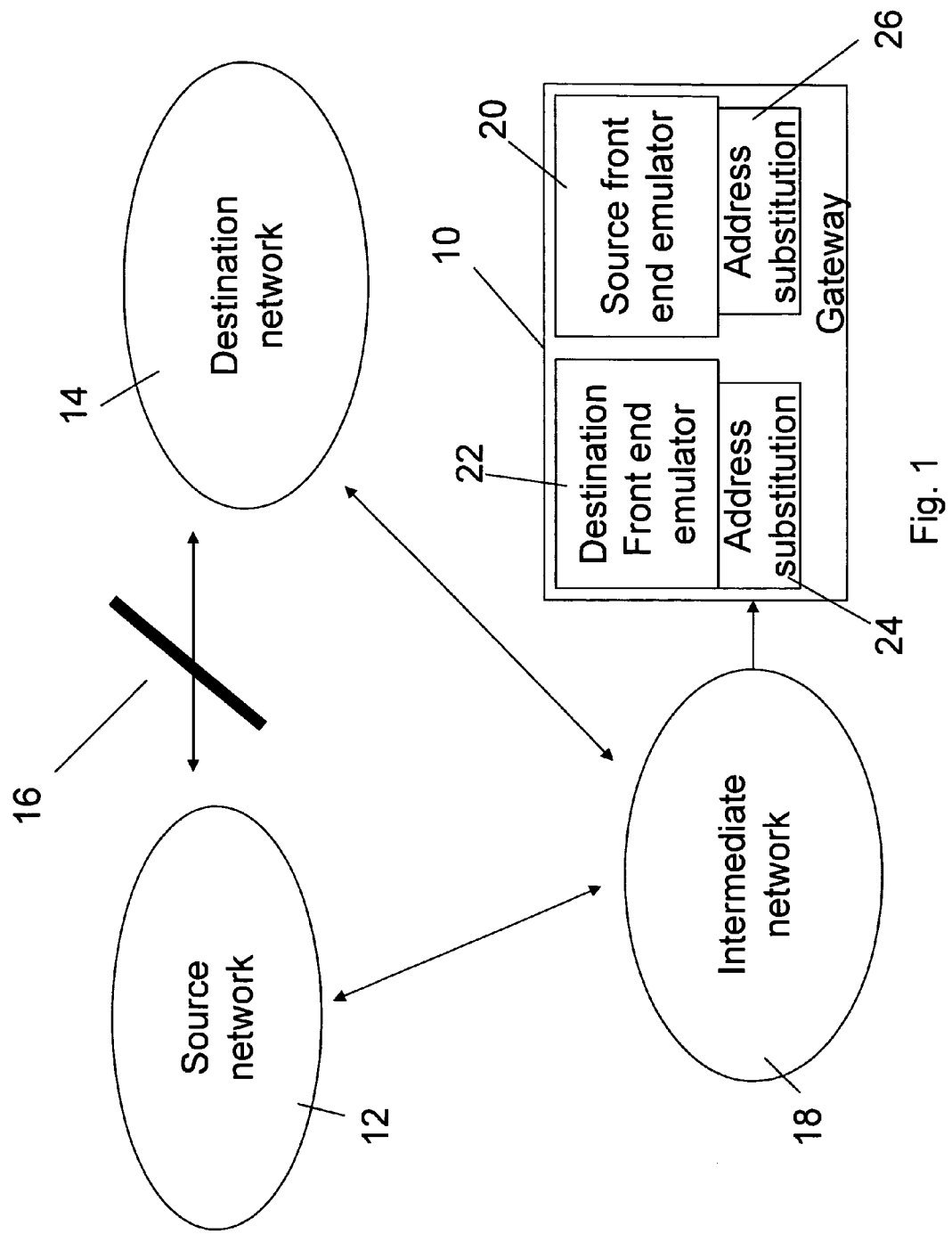
FIG. 1 is a simplified block diagram illustrating an intermediate network mediating between a source and a destination network that do not have direct relations, according to a generalized embodiment of the present invention.

The present embodiments comprise a way in which the planned next generation communication networks can provide full connectivity, without individual network operators having to have agreements in place with every other network in the world. Next generation networks are expected to be packet based and to be fully based on Internet Protocol (IP) for packet transport. The present embodiments relate to the issue of communication between source and destination networks in the case of IP where the full source and destination addresses are placed in the packet header. The source and destination networks are thus fully aware of each other and may well be programmed to prevent data exchange where agreements are not in place.

The present embodiments redirect communication to third party networks and then carry out emulation at the third party network of server activity that source and destination networks would expect to see from each other. Thus the source network sees the third party network as the destination network and the destination network sees the third party network as the source network.

The third party network can be a mobile network, a fixed-line network, or any network entity acting as a mediator, or international carrier, where the source and the destination network could sign a roaming or interworking agreement with.

An interworking gateway (IG) may be located in a third party network. In the case of LTE, the IG receives Diameter commands from the MME of the roaming (visited) network, and acts as an HSS toward the roaming network, at the same time sending the commands to the real HSS at home network and acting now as an MME towards the home network.

In the IMS case SIP is used for the commands and I-CSCF, S-CSCF and P-CSCF components are emulated, as will be discussed below.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates an interworking gateway apparatus 10 for interworking between a source network 12 and a destination network 14. Barred arrow 16 indicates an absence of mutual recognition between the source 12 and destination 14 networks. All communication within the networks is packet communication using internet protocol (IP), including variations or successors thereof, as the transport layer.

The interworking gateway 10 is located on or in association with an intermediate network 18 which has agreements with both the source and the destination networks. Calls for example are placed at the source network 10 and indicate the destination network. The source network knows that it has no agreement with the destination network, yet it has an interest in allowing the call to be completed.

The source network 12 thus forwards all packets whose destination addresses are in a range that defines specific destination network 14 with whom there is no direct agreement, to the intermediate network 18. The intermediate network forwards the packets to gateway 10.

The gateway 10 includes two principle components. The first is a source network front end emulator 20, which emulates front end IP server components of the source network to the destination network. The second is a destination network front end emulator 22, which emulates front end IP server components of the destination network to the source network.

The two emulators 20 and 22 each provide the front end activity of the network being emulated so that the other network can interact as if it is directly connected. Thus the source network interacts as if directly connected to the destination network, and the destination network interacts as if directly connected to the source network. The gateway may thus be transparent to either of the two networks except for the fact that each recognizes the IP address of the gateway and therefore does not bar the communication.

Both the source network front end emulator 20 and the destination network front end emulator 22 include address substitution units 24 and 26 respectively, which substitute the addresses of the source and destination networks with that of the intermediate network. Thus the destination network does not receive packets indicating the source network. Likewise the source network does not receive packets indicating the destination network. Rather each network receives packets indicating the intermediate network as its counterpart.

In one embodiment, the communication between the networks uses the session initiation protocol (SIP), as discussed above in the background. The front end IP server component emulations may thus comprise SIP functions.

Many different kinds of communication can pass between networks, depending on the kind of network. If both networks are roaming networks then one kind of communication may be a roaming registration communication between a mobile device which is roaming and seeks to register at the source network. In order to complete a roaming registration, the network in which the roamer is trying to register may require a registration confirmation from the destination network (which is the home network for the roamer) to confirm that a) the roaming subscriber in fact belongs to the destination network, b) is allowed to roam and c) that the home network may be billed for the roaming activity.

Of course if there are no direct relations between the source and destination networks then no such registration confirmation can be provided, and indeed the source network would not normally even issue the request to the destination network. The present embodiments allow the data packets making up the registration confirmation request to be routed to the gateway 10. At the gateway 10 the source front end emulator 20 sends to the destination network 14 a simulation of the packet(s) that would have been sent had the roaming registration been made at the intervening network. The destination confirms the registration to the gateway and notes the intermediate network as the current address. The gateway then uses the destination front end emulator 22 to send to the source network a registration confirmation. The data packet(s) sent to the source network are an emulation of the interaction that would have occurred had the registering roamer been present at the intermediate network.

Figure 2:
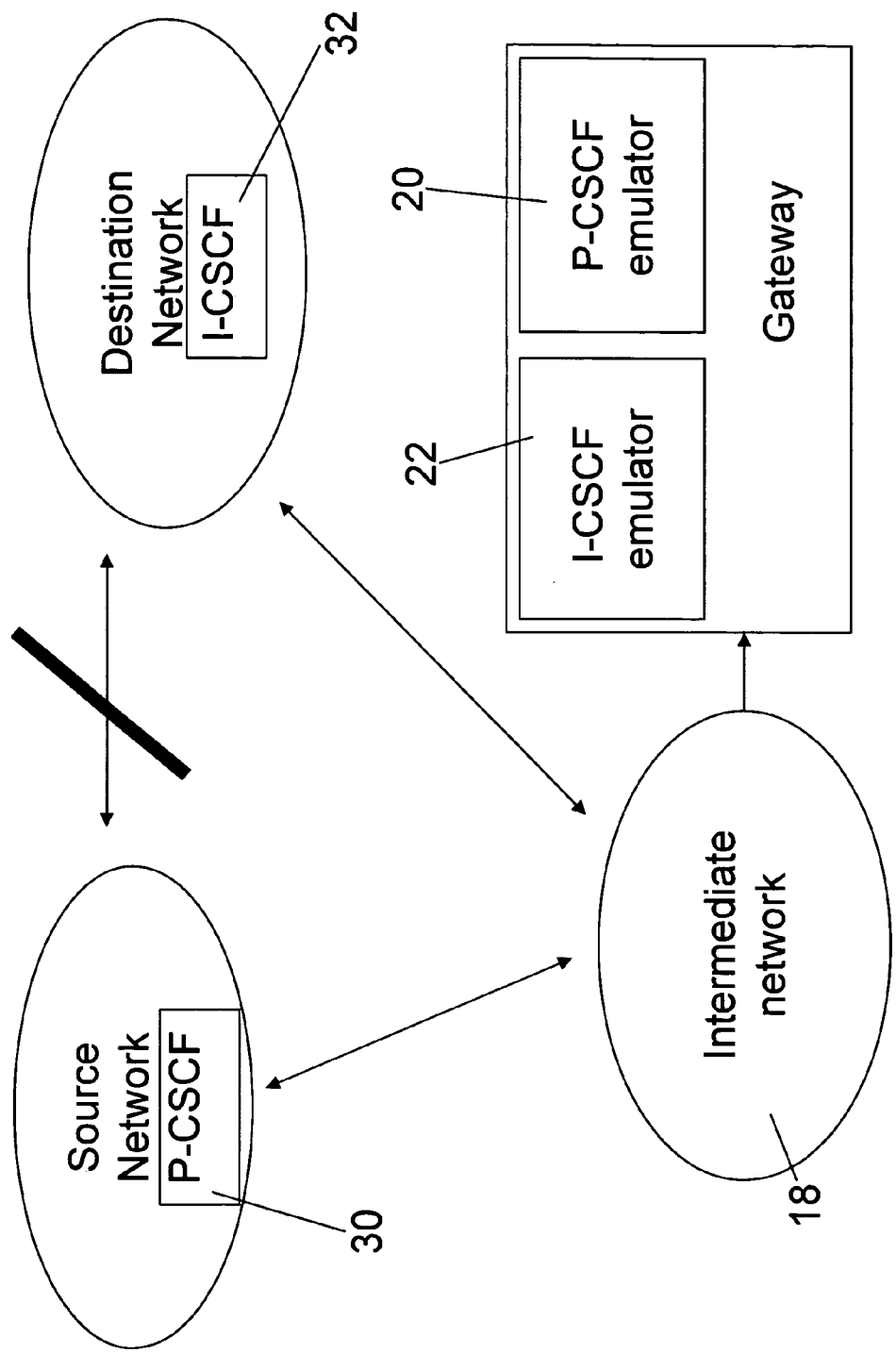
FIG. 2 shows a simplified block diagram illustrating an intermediate network mediating between a source and a destination network that do not have direct relations, according to a roaming embodiment of the present invention wherein a roaming registration is being carried out by a user at the source network and whose home network is the destination network.

Reference is now made to FIG. 2, which illustrates an embodiment of the present invention for the IP multimedia subsystem (IMS). IMS manages network interaction between mobile networks using servers that carry out call session control functions (CSCF)—hence the servers are known as CSCF servers. The functions may be SIP functions. A proxy CSCF (P-CSCF) is the server closest to the telephone initiating a roaming registration. An interrogating CSCF server (I-CSCF) is located at the front of the destination IMS network which should receive the registration request and forward it to the appropriate serving CSCF (S-CSCF).

In the embodiment of FIG. 2, the destination network front end emulator 22 emulates an I-CSCF to the P-CSCF 30 of the source network. The source network front end emulator 20 emulates a P-CSCF to the I-CSCF 32 of the destination network.

The embodiment of FIG. 2 is the typical architecture for roaming users attempting to reach a home network.

A serving CSCF server (S-CSCF) is the central node of the signaling plane. The S-CSCF is a SIP server, but performs session control too. It may always be located in the home network (serving the roaming subscriber), and may use Diameter Cx and Dx interfaces to the home subscription server (HSS) to download user profiles. The Diameter protocol may be used to perform AAA operations, i.e Authentication, Authorization and Accounting.

Figure 3:
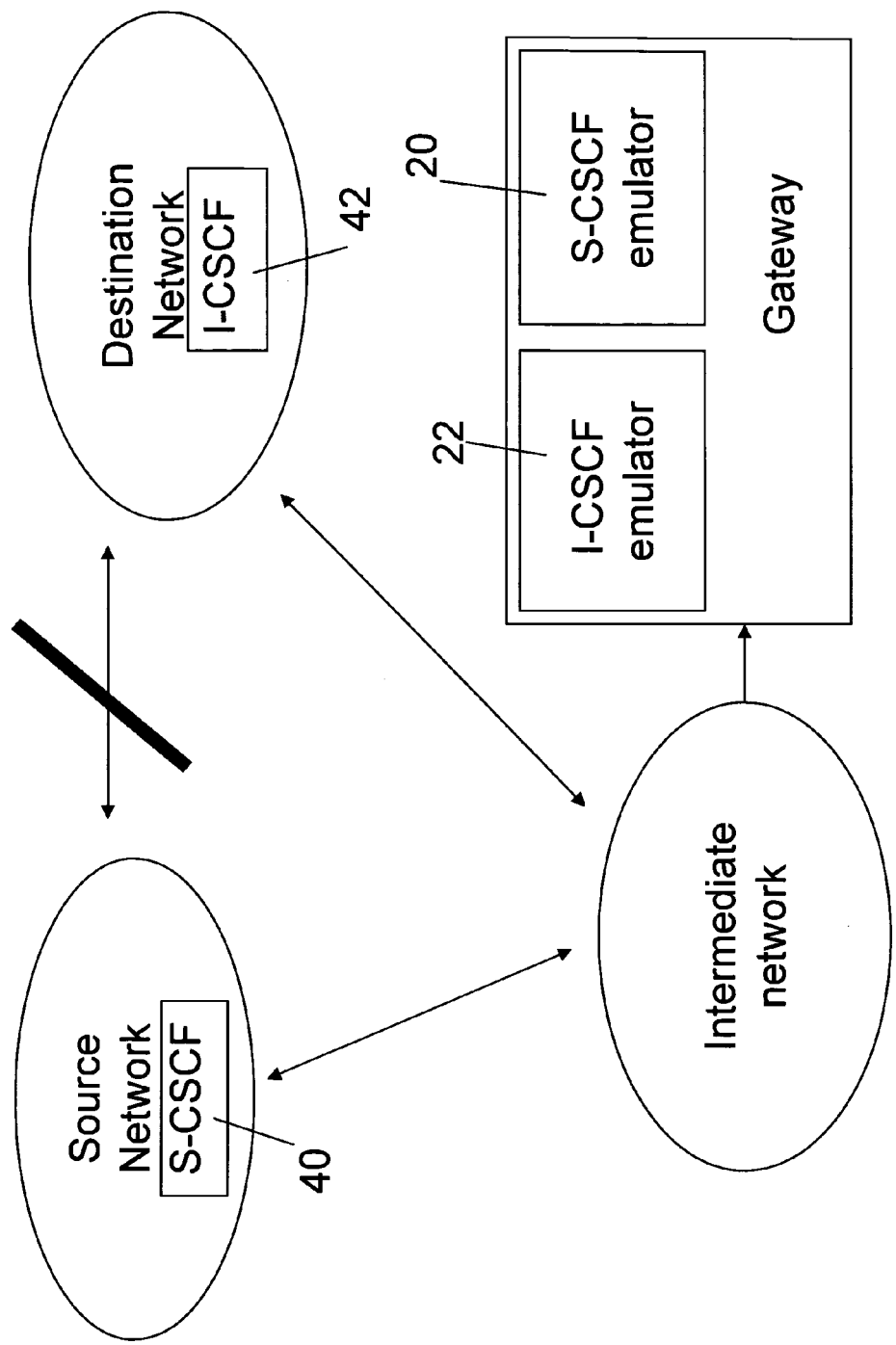
FIG. 3 simplified block diagram illustrating an intermediate network mediating between a source and a destination network that do not have direct relations, according to an interworking embodiment of the present invention where one or both of the networks may be a fixed line or like network.

Reference is now made to FIG. 3, which is an embodiment which shows the destination network front end emulator 22 emulating an I-CSCF to the S-CSCF 40 of the source network. In addition the source network front end emulator 20 emulates an S-CSCF towards the I-CSCF 42 of the destination network. The embodiment of FIG. 3 is the typical architecture for an international call between mobile users of IMS networks, where roaming is not involved. The embodiment may further extend to the case where one or both networks are not mobile networks at all but fixed-line networks or any other networks using IMS It is noted that the emulation of the S-CSCF may be merely an emulation of front end features of such a server, and need not be a full emulation.

Figure 4:
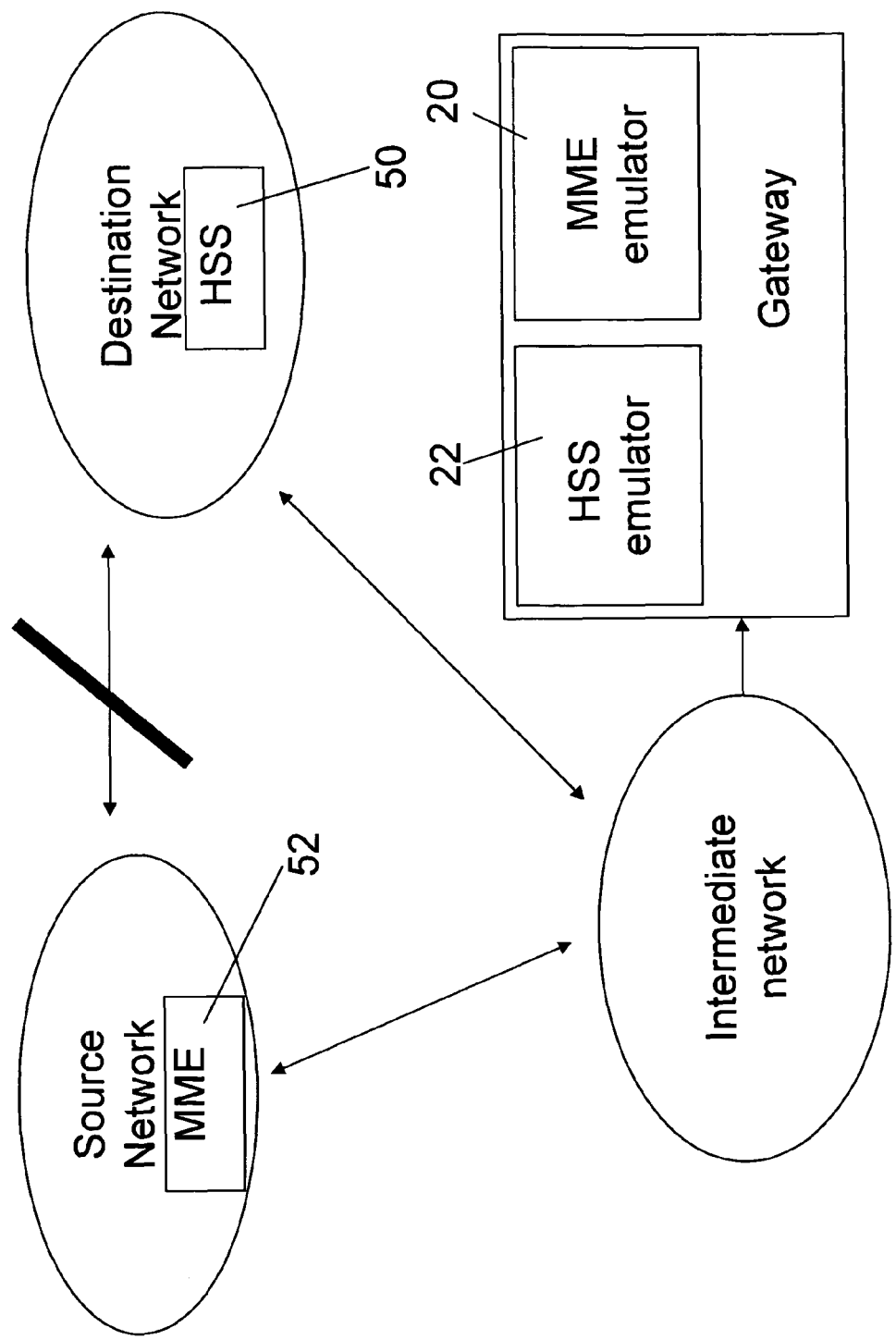
FIG. 4 is a simplified block diagram illustrating an intermediate network mediating between a source and a destination network that do not have direct relations, according to an interworking embodiment of the present invention wherein HSS and MME network elements are emulated.
Figure 5:
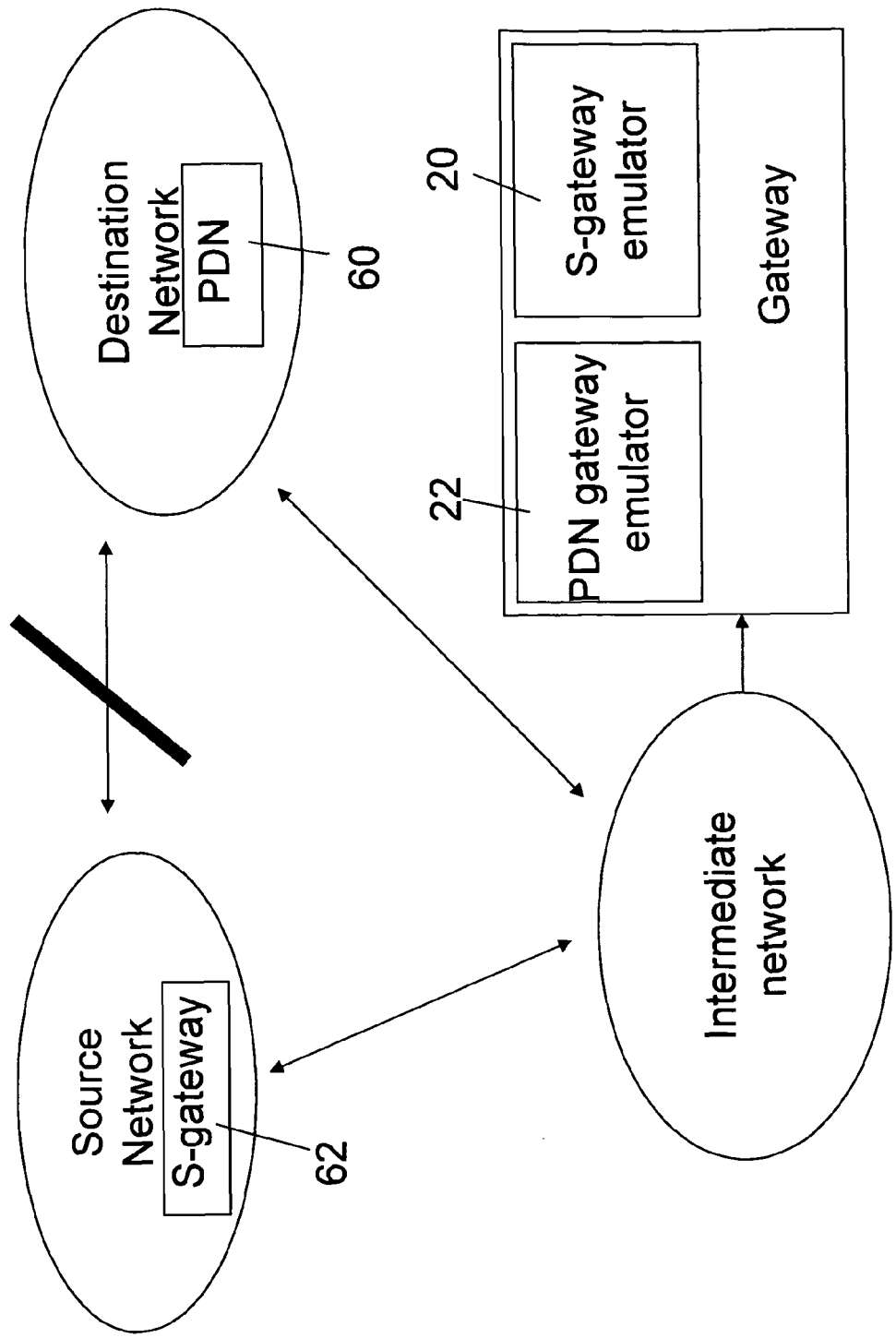
FIG. 5 is a simplified block diagram illustrating an intermediate network mediating between a source and a destination network that do not have direct relations, according to an interworking embodiment of the present invention in which PDN and S-gateway elements are emulated.
Figure 6:
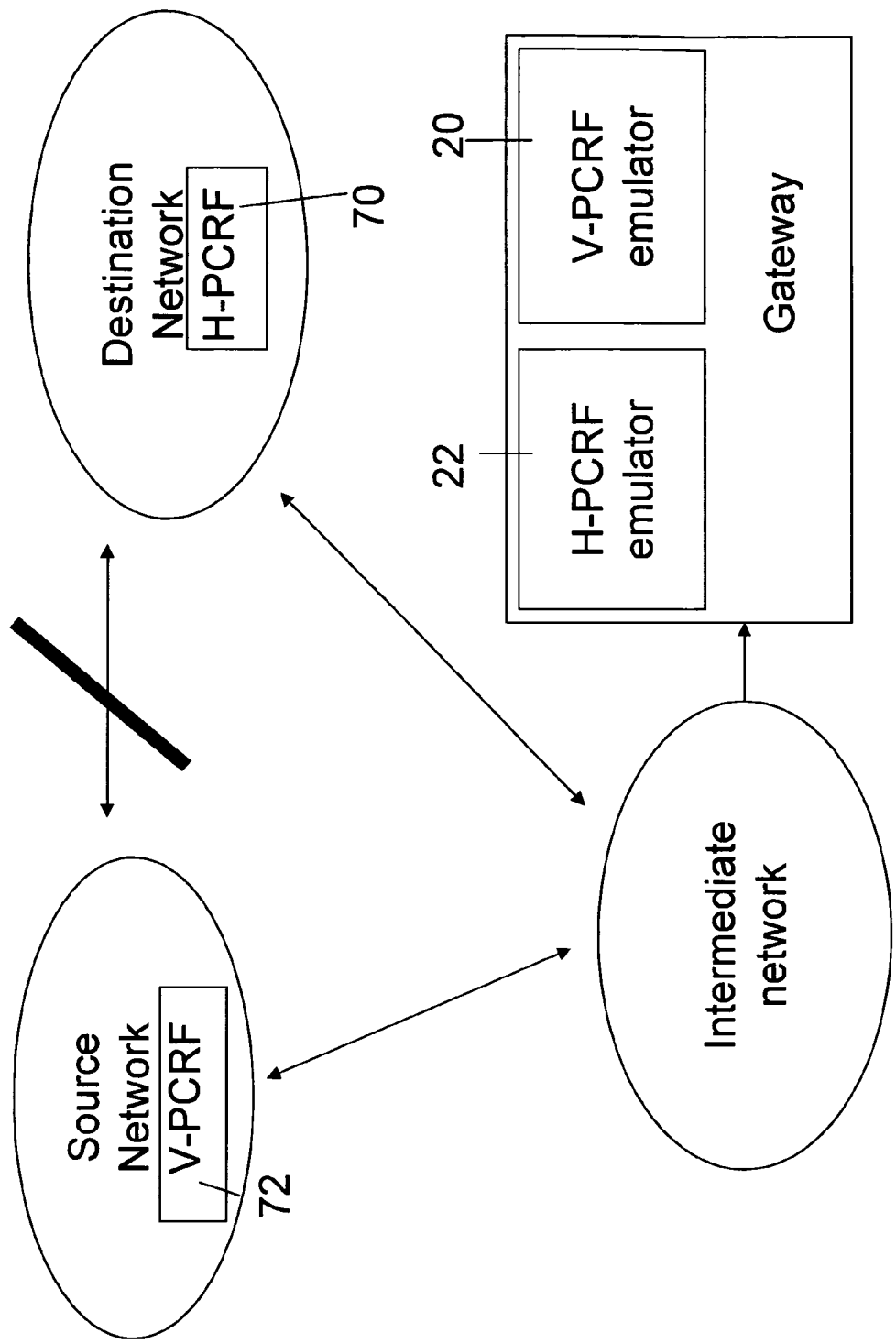
FIG. 6 is a simplified block diagram illustrating an intermediate network mediating between a source and a destination network that do not have direct relations, according to an interworking embodiment of the present invention in which H-PCRF and V-PCRF elements are emulated.

IP-based communication networks have other entities that may be emulated to achieve the same effect, and FIGS. 4 to 6 represent a selection of such entities.

Reference is now made to FIG. 4, which illustrates the LTE case. In FIG. 4, the destination network uses a home subscription server (HSS) to retain details of subscriptions and locations of individual users. The source network front end emulator 20 emulates a mobility management entity, MME, to the HSS 50 of the destination network, and the destination network front end emulator 22 emulates an HSS to the MME 52 of the source network.

Referring now to FIG. 5, the source network front end emulator 20 emulates an S-gateway or serving gateway, to the public data network (PDN) gateway 60 of the destination network, and the destination network front end emulator 22 emulates a PDN gateway to the S gateway 62 of the source network.

Referring now to FIG. 6, the entity in question is a policy charging rule function server, or PCRF, of which there is one at the originating network, and one at the destination network. The source network front end emulator 20 emulates a V-PCRF to the H-PCRF 70 of the destination network and the destination network front end emulator 22 emulates an H-PCRF to the V-PCRF 72 of the source network.

Various aspects of the above embodiments are now considered in greater detail.

Home Subscriber Server

The Home Subscriber Server (HSS), discussed above, is also sometimes known as a User Profile Server Function (UPSF). The HSS is a master user database that supports the IMS or LTE network entities that actually handle calls and data sessions. The HSS contains the subscription-related information (subscriber profiles), performs authentication and authorization of the user, and can provide information about the subscriber's location and IP information. It is similar to the GSM Home Location Register (HLR) and Authentication Centre (AUC).

A Subscriber Location Function (SLF) is needed to map user addresses when multiple HSSs are used. Both the HSS and the SLF communicate through the Diameter protocol also mentioned above. Diameter is used to perform AAA operations, i.e Authentication, Authorization and Accounting.

User Identities

In general, 3GPP networks use the following identities:
International Mobile Subscriber Identity (IMSI)
Temporary Mobile Subscriber Identity (TMSI)
International Mobile Equipment Identity (IMEI)
Mobile Subscriber ISDN Number (MSISDN)

IMSI is a unique phone identity that is stored in the subscriber identification module (SIM). To improve privacy, a TMSI is generated per geographical location. While IMSI/TMSI are used for user identification, the IMEI is a unique device identity and is phone specific. The MSISDN is the telephone number of a user.

IMS also requires an IP Multimedia Private Identity (IMPI) and an IP Multimedia Public Identity (IMPU). Neither are phone numbers or similar series of digits, but rather they are Uniform Resource Identifiers (URIs), which may either comprise digits (a Tel URI, like tel: +1-555-123-4567) or alphanumeric identifiers (a SIP URI, like sip.john.doe@example.com). There can be multiple IMPUs per IMPI (often a Tel URI and a SIP URI). The IMPU can also be shared with another phone, so that both can be reached with the same identity (for example, a single phone-number for an entire family).

The HSS subscriber database may contain the IMPU, IMPI, IMSI, and MSISDN, subscriber service profiles, service triggers and other information, as appropriate.

Call/Session Control

Session Initiation Protocol (SIP) servers or proxies, collectively called Call Session Control Function (CSCF), are used to process SIP signalling packets in the IMS.

A Proxy-CSCF (P-CSCF) is a SIP proxy that is the first point of contact for the IMS terminal. The P-CSCF may be located either in the visited network, if it is a full IMS network, or in the home network, for example if the visited network is not IMS compliant yet. Some networks may use a Session Border Controller for this function. The terminal discovers its P-CSCF. The thus discovered P-CSCF is then assigned to an IMS terminal during registration, and does not change for the duration of the registration. The P-CSCF sits on the path of all signalling messages, and can inspect every message. The P-CSCF authenticates the user and establishes a security association with the IMS terminal. This prevents spoofing attacks and replay attacks and protects the privacy of the user. Other nodes trust the P-CSCF, and do not have to authenticate the user again.

The P-CSCF may also compress and decompress SIP messages, thus reducing the round-trip over slow radio links The P-CSCF may include a Policy Decision Function (PDF), which authorizes media plane resources e.g. quality of service (QoS) over the media plane. Such may be used for policy control, bandwidth management, etc. The PDF can also be a separate function.

The P-CSCF may also generate charging records.

A Serving-CSCF (S-CSCF) is the central node of the signaling plane. It is a SIP server, but performs session control too. It is always located in the home network. It uses Diameter Cx and Dx interfaces to the HSS to download and upload user profiles. The S-CSCF has no local storage of the user. All necessary information is loaded from the HSS.

The S-CSCF handles SIP registrations, which allows it to bind the user location (e.g. the IP address of the terminal) and the SIP address. The S-CSCF sits on the path of all signaling messages, and can inspect every message. The S-CSCF decides to which application server(s) the SIP message will be forwarded, in order to obtain their services. The S-CSCF provides routing services, typically using Electronic Numbering (ENUM) lookups. The S-CSCF enforces the policy of the network operator. Furthermore there can be multiple S-CSCFs in the network for load distribution and high availability reasons. It is the HSS that assigns the S-CSCF to a user, when the HSS is queried by the I-CSCF.

An Interrogating-CSCF (I-CSCF) is another SIP function located at the edge of an administrative domain. Its IP address is published in the Domain Name System (DNS) of the domain, so that remote servers can find it, and use it as a forwarding point (e.g. registering) for SIP packets to this domain.

The I-CSCF queries the HSS using the Diameter Cx interface to retrieve the user location and then routes the SIP request to its assigned S-CSCF. In versions of IMS up to Release 6 the I-CSCF may also be used to hide the internal network from the outside world, by encrypting part of the SIP message, in which case the I-CSCF is referred to as a Topology Hiding Inter-network Gateway (THIG). From Release 7 onwards such a function is removed from the I-CSCF and becomes part of the Interconnection Border Control Function (IBCF). The IBCF is used as a gateway to external networks such as the Internet or fixed line telephone networks.

(1) IMS Roaming Broker

Figure 7:
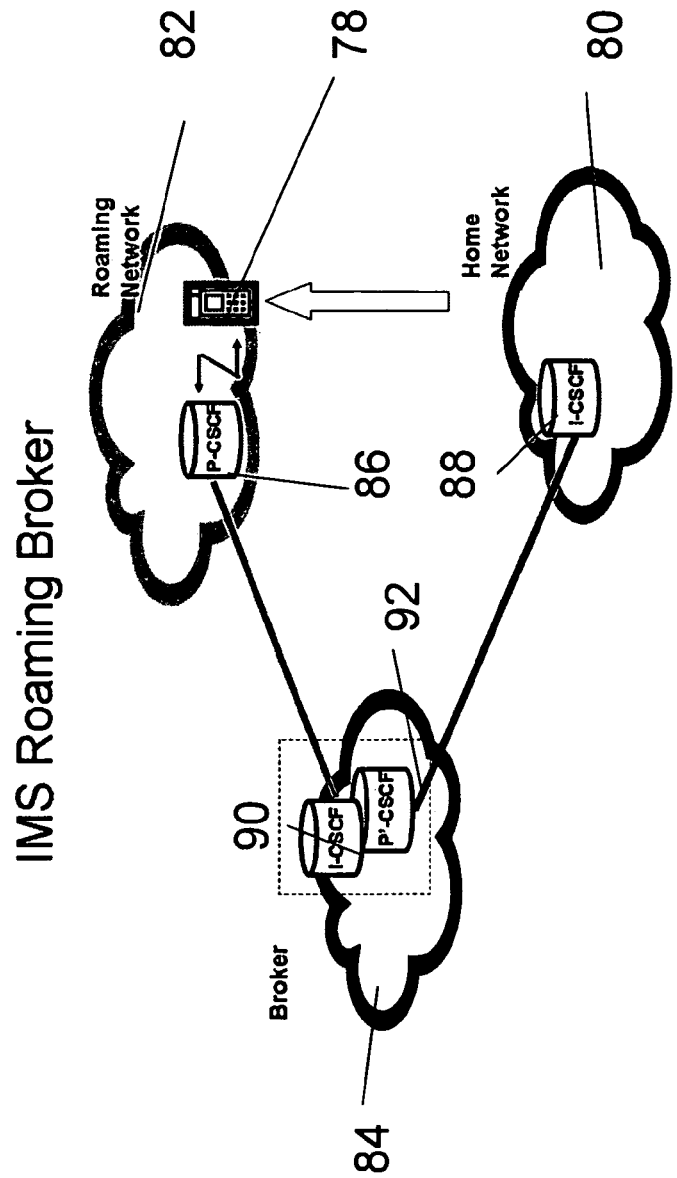
FIG. 7 is a simplified diagram showing interworking between the various elements in the roaming broker embodiment of FIG. 2.

Reference is now made to FIG. 7, which illustrates an implementation of the present embodiments as a roaming broker for IMS networks. The technical idea behind the IMS Roaming Broker may be explained by the following example. Assume a subscriber 78 to a cellular network 80 in Germany is trying to roam from Germany to a new network in Africa, roaming network 82, which has no roaming agreements with the German operator. However the African network has signed an agreement with the roaming broker 84 located in Turkey. When a roaming subscriber turns on the mobile device in a roaming network, a registration request is routed to the home network. If the request were routed to the Germany network it would have been denied, since the German network does not have agreements with the African network. Hence, the registration request is routed to the Turkish broker 84, which emulates the home network. Now the broker modifies the origin address of the African network into an Turkish network, and routes the registration request to the German network. The German network may assume the subscriber is registered in Turkey, and may accept the registration.

In greater detail, when the roaming user tries to register in Africa, the P-CSCF IMS server component 86 discussed above, would normally route the registration to the I-CSCF 88 of the home network 80. In the present case the broker 84 takes the place of the home network and emulates the activity of the I-CSCF using I-CSCF emulator 90. Thus the part of the home network is taken up by the broker. The broker may modify the original address, and may then route the request to the real home network, now acting as a P-CSCF 92 towards the I-CSCF 88 of the home network. The broker 84 is therefore an emulation of I-CSCF and P-CSCF, emulating the home network on one side and the roaming network on the other side.

The broker may also take care also of the call data records (CDR) of the roaming activity which would normally be transferred directly between the originating and destination network, for billing purposes. In the present embodiment the CDRs may be transferred via the roaming broker and adapted accordingly, so as to allow all concerned networks to accept the addresses.

(2) IMS Interoperability Broker

Figure 8:
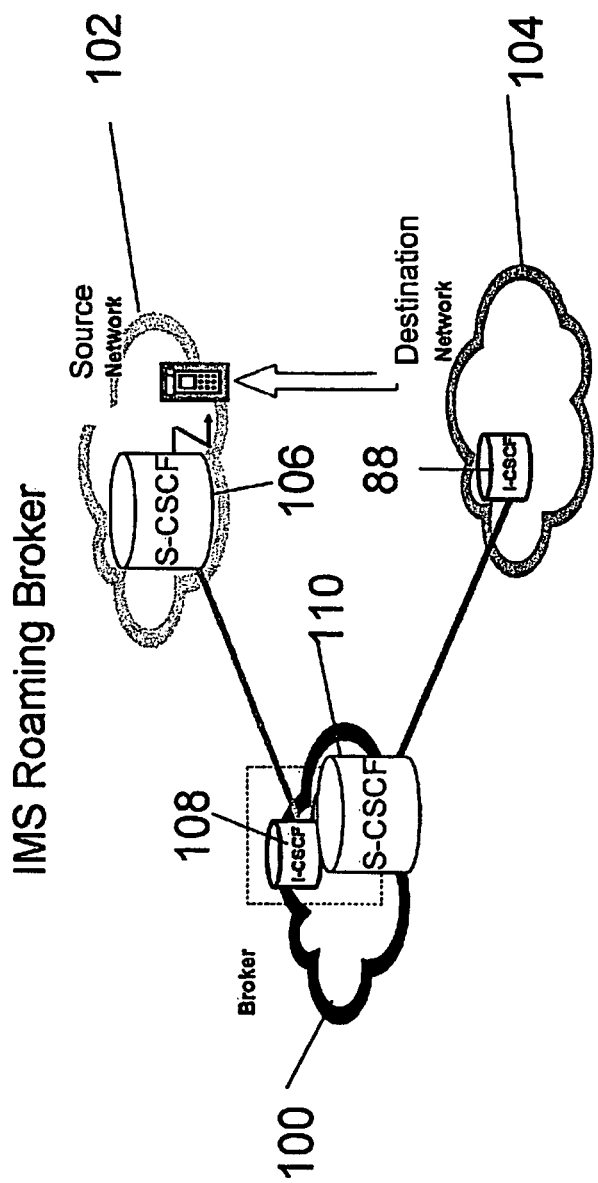
FIG. 8 is a simplified diagram showing interworking between the various elements in the interworking embodiment of FIG. 3.

The above situation refers to cellular networks and particularly to the case of one of the parties roaming away from his home network. The embodiment of FIG. 8, to which reference is now made, is applicable where there is no roaming and where one or more networks are fixed line networks or telephone Internet services. The part of the roaming broker of FIG. 7 is taken by an IMS interoperability broker 100 which simply mediates between any two IP-based networks 102 and 104 that do not have direct relationships between them. In the case of the interoperability broker, a call, or IP session, is placed from the originating network 102 to the destination network 104, between two subscribers of networks 102 and 104 respectively (an international call for example).

In IMS, in order for a direct communication between two networks, the S-CSCF 106 serving the originating user, or another entity in the IMS network, such as a breakout gateway (BGCF) may know the network serving the destination user, in order to route the session towards that network. The other option is to use an international carrier, for all networks unknown to the originating network. However the carrier may have to modify the source address of the originating network, otherwise the destination network may not accept the session. If the destination network is located in a country hostile to that of the originating network, or if there are competitive business relations between the source and destination countries, the session may not be connected unless the source address is changed and replaced with the carrier or broker address. Thus intermediate network 18 may be an International carrier. The IMS broker 100 may thus be located at such an international carrier or elsewhere, and may act as an I-CSCF 108 towards the originating network, in order to obtain the session. Then, it needs to act as an S-CSCF 110 towards the destination network, with which it does have interoperability relations. The broker may modify the source address if needed, so the destination network does not see any trace of the originating network.

The broker in this case is a combination of the relevant portions of IMS I-CSCF 108 and S-CSCF 110, while in the roaming case (FIG. 7) it emulates I-CSCF+P-CSCF. Note the broker emulates the S-CSCF only as far as is necessary to appear to be the origin for the session. There is no need to implement the full S-CSCF capabilities.

In other cases, the broker 100 may act as a media gateway, or another IMS entity towards the destination network, not necessarily an S-CSCF, as long as it is an IMS entity that is able to route a call from an IMS network to another IMS network, and modify the source address of the session. Examples have been given in FIGS. 4-6 above.

IMS Roaming Broker Flows

Figure 9:
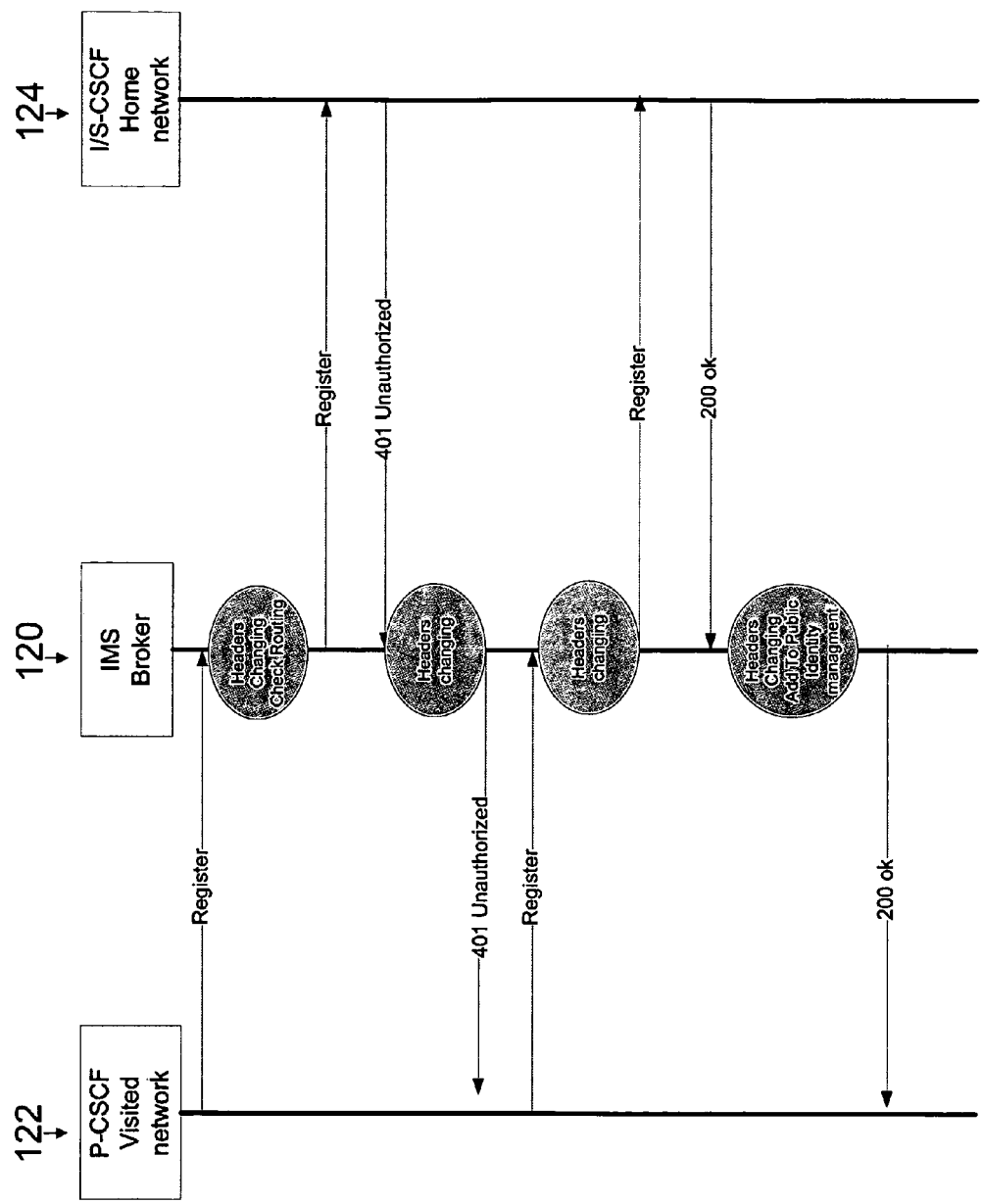
FIG. 9 is a simplified diagram showing signal flow for roaming registration according to the embodiment of FIG. 2.
Figure 10:
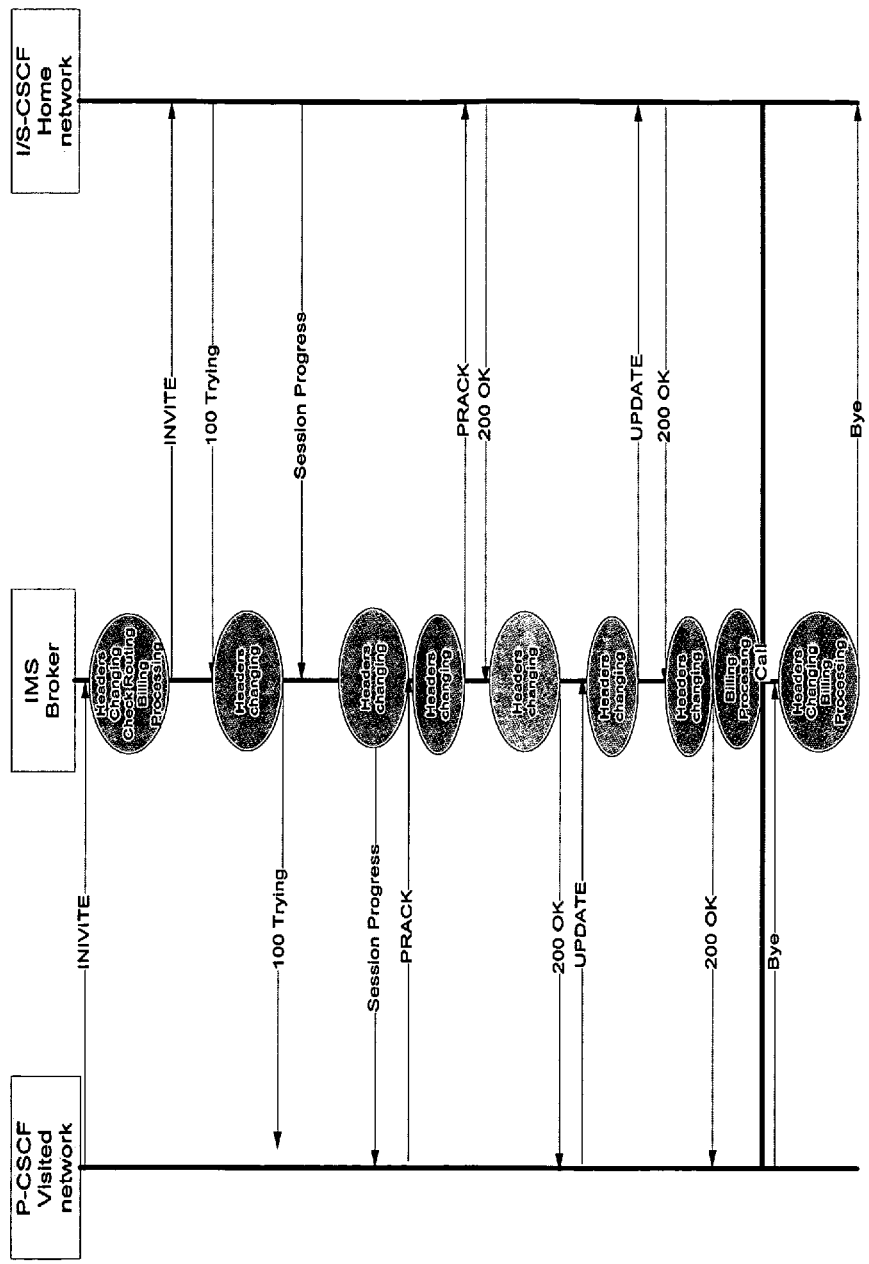
FIG. 10 is a simplified diagram showing signal flow for a mobile originated call in the embodiment of FIG. 2.
Figure 11:
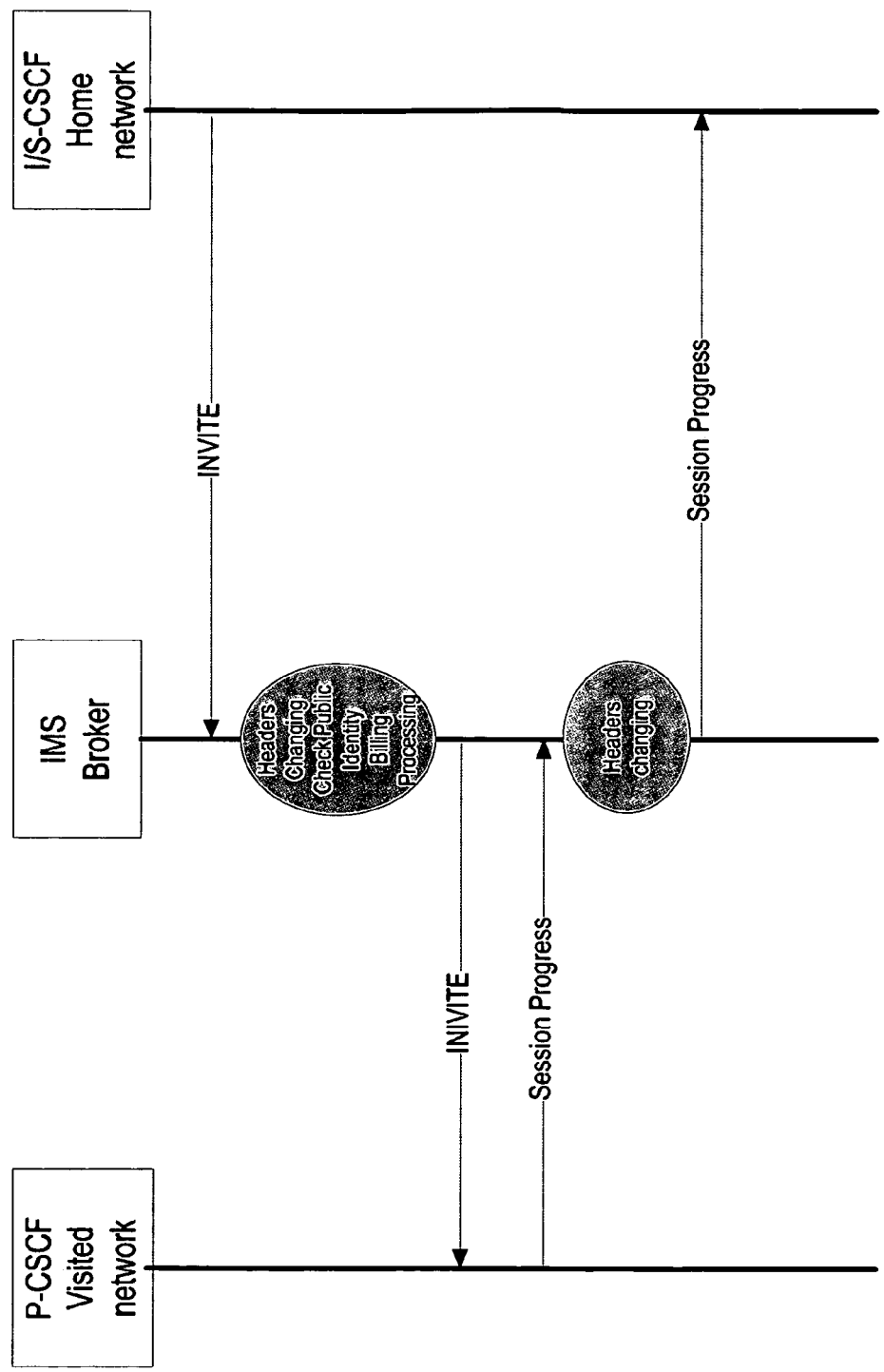
FIG. 11 is a simplified diagram showing signal flow for a mobile terminated call in the embodiment of FIG. 2.

FIGS. 9, 10 and 11 respectively show the three basic flows of roaming registration, that is a roaming subscriber in a visited network registering to the home network—FIG. 9, a mobile originated call—FIG. 10 and a mobile terminated call—FIG. 11. The flows for the interoperability broker are similar.

Registration

FIG. 9 shows a registration procedure according to a preferred embodiment of the present invention.

The home network 120 does not have a roaming agreement with the Visited Network 122.

The IMS Broker network 124 is a broker between the home and visited networks.

The end user terminal registers to the visited network. The visited network routes the message to the IMS broker network to complete the registration.

The IMS broker checks the routing for the user and changes the P-Visited-Network-ID header, changes the Path header to its own URI instead of the visited network P-CSCF path, and further adds a global unique ICID-value (IMS Charging IDentifier) to the P-Charging-Vector header.

The IMS broker sends the registration message to the home network.

After the home network has checked the registration message the home network challenges the IMS end user with a 401 Unauthorized message and sends it to the IMS broker. The IMS broker removes itself from the path and adds the P-CSCF of the visited network to the path.

The End user sends a new registration message with the authentication vector. The IMS broker again changes the Path, p-Charging-Vector and p-Visited-Network-Id.

After the home network authenticates and authorizes the user it sends a 200 ok message to the IMS broker. The IMS broker changes the Path header and sends the 200 ok message to the P-CSCF of the visited network.

The IMS Broker adds the public Identity of the present user to its Public-Identity management so that the roaming user, now registered, can be found when requested by an incoming (mobile terminated) call.

Mo Call:

Reference is now made to FIG. 10, which illustrates the flow in a mobile originated call via the broker. The End user, currently located and registered at the visited network, makes a voice call. The call is routed to the IMS broker by the P-CSCF. The information regarding the need to forward the call to the IMS broker has been stored in the registration process.

The IMS Broker starts a billing record for the session, saving the ICID of the visited network, checks the routing to find the home network of the subscriber by the routing table and changes the P-Visited-Network-ID and PATH headers.

The IMS Broker creates and adds an ICID to the p-Charging-Vector header for the home network side.

During the negotiation the IMS broker changes the P-Visited-Network-ID and PATH headers.

When the call is established the IMS broker updates the billing records for both the visited and the home networks.

When the call ends the IMS broker updates and finalizes the billing records.

Mt Call:

Reference is now made to FIG. 11, which illustrates a mobile terminated call, that is a call that terminates at the roaming mobile user. An invite message is routed from the home network to the IMS broker for the roaming user. The information about the location of the subscriber has been stored in the S-CSCF during the registration process.

The IMS broker checks the Public Identity in order to route the message to the visited network that hosts the subscriber.

The IMS broker changes the PATH header and routes the message to the visited network.

The IMS broker set billing records for the call.

The IMS broker updates the billing records as the call progresses, that is between answer and release.

As usual the IMS broker changes the P-Visited-Network-ID and PATH headers.

Figure 12:
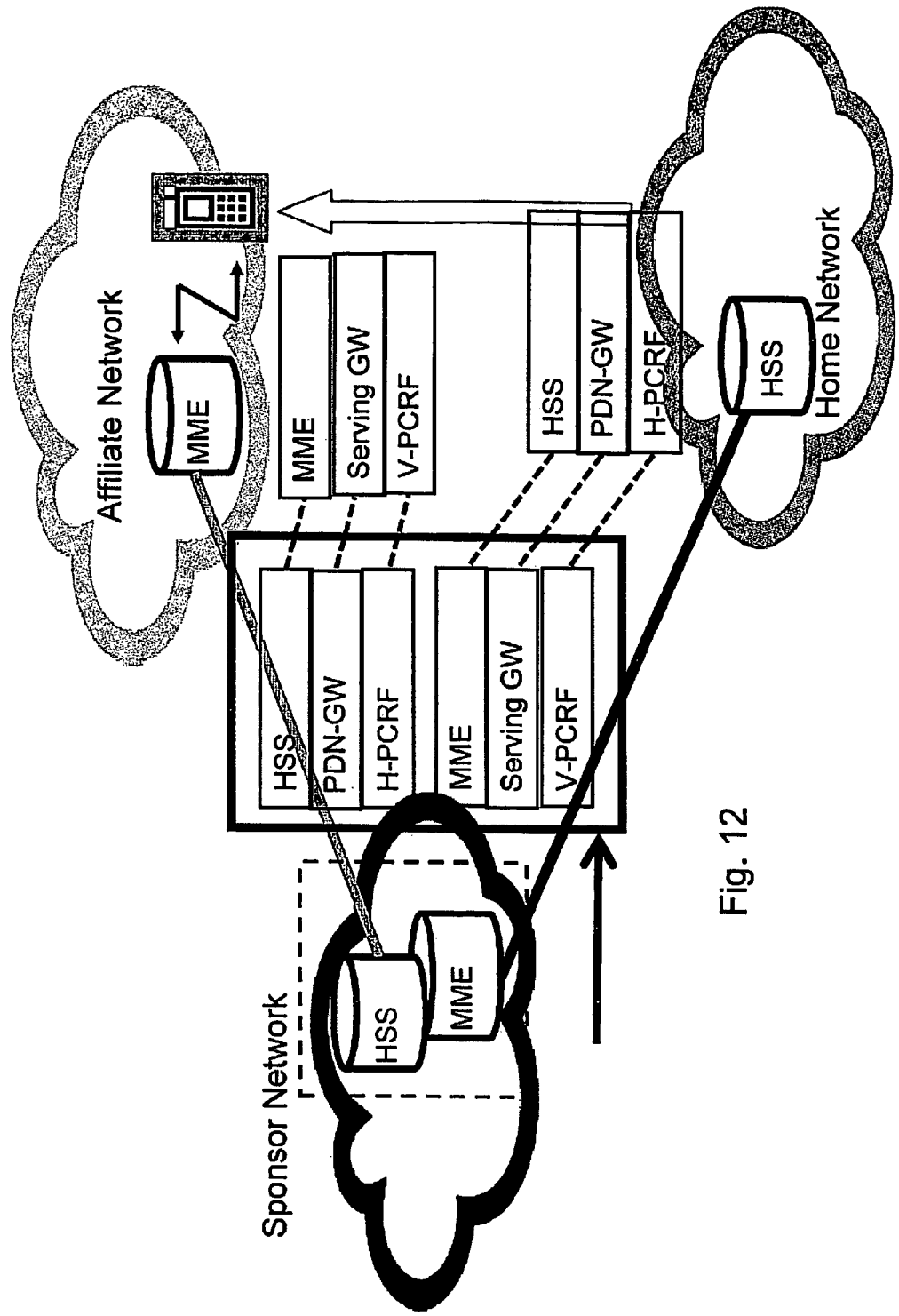
FIG. 12 is a simplified diagram showing a generalized embodiment of an interworking broker of the present invention in which all the emulations of FIGS. 4, 5 and 6 are combined.

Reference is now made to FIG. 12, which shows a general solution in which the various entities of FIGS. 4, 5 and 6 are included in a single interoperability interworking device. The solution platform, located at the sponsor network emulates any of the HSS, PDN gateway and H-PCRF towards the affiliate network, and emulates any of the MME, serving gateway and V-PCRF towards the home network.

Currently, IMS is available on an experimental basis on certain networks around the world but only provide services to users indicating that they appear to be from the same network. Emulation using the current embodiments allows users on other networks to appear to be on the same network and thus obtain IMS services.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Gateway apparatus for interworking between source and destination communication networks, wherein there is an absence of mutual recognition between said source and destination networks, communication within said source and destination networks using internet protocol (IP), the gateway apparatus comprising:
    a source network front end emulator for emulating front end IP server components of said source network to said destination network; and
    a destination network front end emulator for emulating front end IP server components of said destination network to said source network; thereby to mediate communications between said source and said destination networks in said absence of mutual recognition between said source and destination networks, wherein said communications use a diameter protocol, and wherein front end IP server component emulations comprise diameter functions, and said communication is a roaming registration communication between a mobile device registering at said source network and seeking registration confirmation from said destination network.

2. The gateway apparatus of claim 1, being located in association with a third communication network entity that is recognized by both said source network and said destination network.

3. The gateway apparatus of claim 1, wherein said communications use a session initiation protocol (SIP) and wherein the front end IP server component emulations comprise SIP functions.

4. The gateway apparatus of claim 3, wherein the destination network front end emulator emulates an interrogating—call session control function server (I-CSCF) to a proxy—call session control function server (P-CSCF) of the source network, and the source network front end emulator emulates the P-CSCF to the I-CSCF of the destination network.

5. The gateway apparatus of claim 3, wherein the destination network front end emulator emulates an interrogating—call session control function server (I-CSCF) to a serving—call session control function server (S-CSCF) of the source network, and the source network front end emulator emulates the S-CSCF towards the interrogating—call session control function server (I-CSCF) of the destination network.

6. The gateway apparatus of claim 1, wherein the source network front end emulator emulates a mobility management entity (MME) to a home subscriber server (HSS) of the destination network, and the destination network front end emulator emulates the HSS to the MME of the source network.

7. The gateway apparatus of claim 1, wherein the source network front end emulator emulates an S-gateway to a public data network (PDN) gateway of the destination network, and the destination network front end emulator emulates the PDN gateway to the S-gateway of the source network.

8. The gateway apparatus of claim 1, wherein the source network front end emulator emulates a visitor—policy charging rule function (V-PCRF) to a home—policy charging rule function (H-PCRF) of the destination network and the destination network front end emulator emulates the H-PCRF to the V-PCRF of the source network.

9. The gateway apparatus of claim 2, wherein said source network front end emulator comprises a source address substitution unit to substitute, within data packets, an address indicating the source network with an address indicating said third communication network entity.

10. The gateway apparatus of claim 2, wherein said destination network front end emulator comprises a destination address substitution unit to substitute, within data packets, an address indicating the destination network with an address indicating the third communication network entity.

11. Method for interworking between source and destination communication networks, wherein there is an absence of mutual recognition between said source and destination networks, communication within said source and destination networks using internet protocol (IP), the method comprising:
    emulating front end IP server components of said source network to said destination network; and
    emulating front end IP server components of said destination network to said source network; thereby to mediate communications between said source and said destination networks in said absence of mutual recognition between said source and destination networks, wherein said communications use a diameter protocol, and wherein front end IP server component emulations comprise diameter functions, and said communication is a roaming registration communication between a mobile device registering at said source network and seeking registration confirmation from said destination network.

* * * * *